L. SHEPARD.
Pendulum Scales.
No. 53,050.            Patented March 6, 1866.
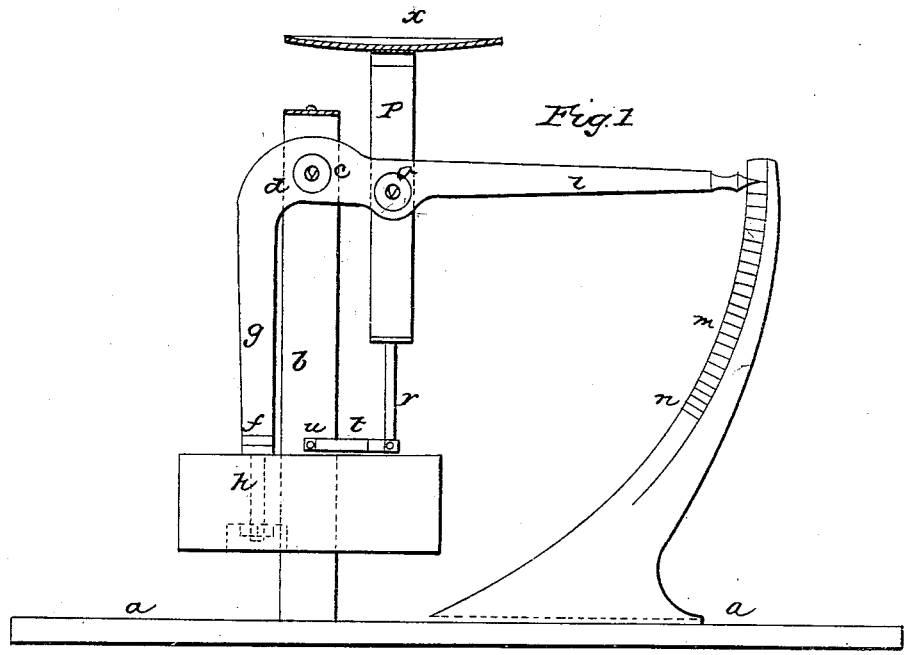
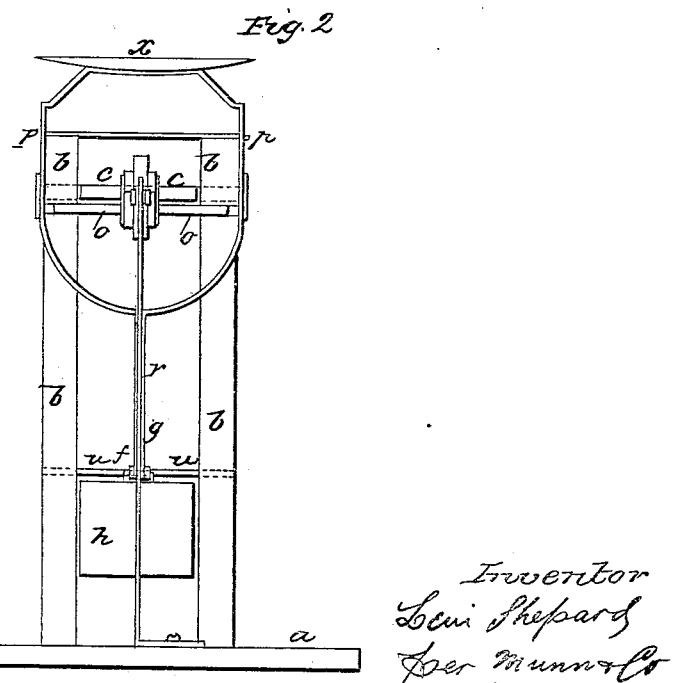

UNITED STATES PATENT OFFICE.

LEVI SHEPARD, OF GOLD HILL, NEVADA.

IMPROVEMENT IN SCALES FOR WEIGHING.

Specification forming part of Letters Patent No. 53,050, dated March 6, 1866.

*To all whom it may concern:*

Be it known that I, LEVI SHEPARD, of Gold Hill, in the county of Storey and Territory of Nevada, have invented a new and useful Improvement in Weighing-Scales; and I do hereby declare that the following is a full, clear, and exact description thereof, which will enable others skilled in the art to make and use the same, reference being had to the accompanying drawings, forming part of this specification.

My said invention relates to that class of weighing-scales which are so constructed that the weight of an article on the pan is indicated by a pointer upon a graduated scale.

My improvement consists in attaching the weight to a vertical arm which projects downward at a right angle to a horizontal arm, which is formed in one piece with or rigidly attached to the first and supports the pan upon which the object to be weighed is placed. I thus produce a scale possessing very great accuracy for small weights and very great capacity for large weights, inasmuch as a small weight placed upon the pan when the weight-arm hangs vertically will move it a considerable distance and cause a corresponding motion of the index, but as the pan approaches the vertical line of the fulcrum and the weight recedes therefrom the latter acts on the former with constantly increasing effect, so that the apparatus will serve for weights of almost indefinite amount, having, however, less accuracy as the weight increases.

In accompanying plate of drawings my improvement is represented, Figure 1 being a view of one side of the same, and Fig. 2 an end view.

$a\ a$ in the drawings represent the bed-plate of the scale, having at or near one of the ends two parallel upright standards, $b\ b$, in and across which, at or near their upper ends, turning in suitable bearings thereof, is a horizontal shaft, $c$. Attached to shaft $c$, and so as to turn with it, is a right-angular arm, $d$, to the lower end, $f$, of the vertical portion $g$ of which is secured a heavy weight, $h$, made of any suitable metal or other material, the outer end of the other or horizontal portion, $l$, of the angular arm being made of the shape of a pointer or index-hand, and moving over the graduated surface $m$ of a vertical arc or circular-shaped piece or arm, $n$, secured at its lower end by means of screws, or in any other proper manner, to the bed-plate $a$, before referred to. At a short distance from the shaft $c$, on which the right-angular arm $d$ is secured, as described, and between it and the index-hand of the arm, a transverse horizontal rod, $o$, is inserted in the portion $l$ and projecting from each side of and at equal distances from the same, on the outer ends of which rest the two parallel upright bars or plates $p\ p$, secured together at their upper ends, and to and on which the pan or dish $x$, used for holding the materials or substances to be weighed, is either permanently attached or so as to be easily detached or removed therefrom at pleasure, the lower end of the bars being secured to a short vertical rod, $r$, hung by a pivot-joint at its lower end to the outer end, $s$, of a short horizontal connecting-rod, $t$, turning upon a fixed cross-shaft, $u$, of the bed-plate standards.

The various parts and devices composing my improved weighing-scale, and hereinabove particularly referred to and described, are so arranged together that when the pan or dish is in a quiescent state the index-hand or pointer of the scales shall be at the zero-point of the graduated arc, and, furthermore, so that when the pan is depressed in the least degree the index-hand shall be moved the proper distance over the graduated arc to point to the graduation thereon, indicating the exact weight of the material in or on the pan.

I claim as new and desire to secure by Letters Patent—

The horizontal pan-supporting arm $l$ and vertical pendent weight-arm $g$, mounted at their angle on the pivot $c$, in combination with the graduated scale $m$ and pan-frame $o\ p\ r\ s\ t\ u$, all arranged to operate in the manner and for the purposes specified.

The above specification of my invention signed by me this 8th day of May, 1865.

LEVI SHEPARD.

Witnesses:
 M. M. LIVINGSTON,
 ALBERT W. BROWN.